US006715636B2

(12) United States Patent
Beauregard

(10) Patent No.: US 6,715,636 B2
(45) Date of Patent: Apr. 6, 2004

(54) VENDING MACHINE FOR DISPENSING CANS & BOTTLES WITH STOP MEMBER

(75) Inventor: Ronald H. Beauregard, Ft. Lauderdale, FL (US)

(73) Assignee: Thomas Plastics, Inc., Hollywood, FL (US)

( * ) Notice: Subject to any disclaimer, the term of this patent is extended or adjusted under 35 U.S.C. 154(b) by 53 days.

(21) Appl. No.: 10/060,778

(22) Filed: Feb. 1, 2002

(65) Prior Publication Data

US 2003/0146239 A1 Aug. 7, 2003

(51) Int. Cl.[7] ................................................ B65G 59/00
(52) U.S. Cl. .......................... 221/92; 221/279; 221/307
(58) Field of Search .......................... 221/92, 123, 124, 221/131, 279, 307; 211/59.2, 59.3; 312/42, 45, 71, 72, 73

(56) References Cited

U.S. PATENT DOCUMENTS 5,366,099 A * 11/1994 Schmid ..................... 211/59.3
5,685,664 A * 11/1997 Parham et al. ......... 211/59.3 X
5,855,281 A * 1/1999 Rabas ........................ 211/59.3
5,878,895 A * 3/1999 Springs ..................... 211/59.3
6,142,317 A * 11/2000 Merl .......................... 211/59.3
2001/0002659 A1 * 6/2001 Bada .......................... 211/59.2

* cited by examiner

*Primary Examiner*—David H. Bollinger

(57) ABSTRACT

An improved vending machine having a plurality of vertically inclined racks therein for dispensing products is disclosed. Each rack within such vending machine has an open end and closed end, wherein the open end thereof is provided with a mechanical stop or gate having essentially no mechanical moving parts, for control of the dispensing of products from such racks in response to customer demand for product from such rack. In the preferred embodiments of this invention, the mechanical stop or gate is formed of a resilient deformable material (e.g. natural or synthetic rubber or an equivalent elastomer), and includes means for engagement of a complimentary recess or slot at the end of the product dispensing rack. In the preferred embodiments of this invention, more than one stop or gate is provided at the open end of each rack within the vending machine, so as to provide equal pressure to each side of the container within the rack and thus assist in maintaining the proper orientation of the containers within the rack.

8 Claims, 5 Drawing Sheets

VENDING MACHINE FOR DISPENSING CANS & BOTTLES WITH STOP MEMBER

BACKGROUND OF THE INVENTION

1. Field of the Invention

This invention relates to an article of manufacture. More specifically, this invention is directed to an improvement in vending machines designed for the storage and dispensing of containers, preferably beverage containers in the form of cans or bottles.

2. Background of Invention

Vending machines generally, and beverage vending machines, in particular, are of two basic designs and include a product storage cabinet (with or without refrigeration). These two basis designs include:

(a) Means for gravity-feeding product dispensers, wherein the containers are positioned above the dispensing window and incrementally released so as to effect dispensing thereof, or, alternatively, (b) Means for elevator-feeding product dispensers, wherein the containers are loaded upon a platform disposed within a storage channel that is inclined from the horizontal, the platform is advanced upwardly, relative to the horizontal plane and within the storage channel. In this latter configuration, the incremental release or displacement of the contents from the top of the storage channel discharges the contents of the storage channel through a dispensing window in much the same manner as the gravity fed systems.

In each instance, the vending machines also generally include means to maintain the containers in an ordered array and means to displace such containers from such ordered array, in response to a customer selection. Because the containers (other than cans) generally have a characteristic shaped indicative of a trade dress or design, their retention within the vending machine, specifically, within vertical storage channels, can present difficulties and challenges.

The following patents are representative of the art in each of these two systems: U.S. Pat. Nos. 5,813,569; 6,112,943; 6,199,720; 6,230,908; and 6,253,954. Each of these patents is discussed in order of its date of issue and, thus, no significance is to be attached to the priority assigned to the review and discussion.

U.S. Pat. No. 5,813,569 (to Cihanek, issued Sep. 29, 1998) discloses a point-of-sale cabinet for merchandising products (e.g. packages of cigarettes) adjacent a cashier counter. The cabinet includes a housing having a top opening and a product dispensing rack disposed upright in the housing. The dispensing rack is positioned in the housing so that products supported thereon are accessible through the top opening. The dispensing rack has a bottom surface and includes a plurality of base plates and vertical guides. Each base plate is configured to support a plurality of vertically stacked products disposed thereon. The dispensing rack further includes a plurality of biasing members disposed between the base plates and the bottom surface of the dispensing rack for urging the base plates upwardly along a vertical path defined by the vertical guides so that each of the vertically stacked products may be sequentially accessed through the top opening of the housing. More specifically, a retainer flange partially extends over the top opening of each vertical stack to retain the vertically stacked products within the merchandiser until the merchant or customer removes the top product from the stack.

U.S. Pat. No. 6,112,943 (to Lauer, issued Sep. 5, 2000) discloses a method of vending bottles from a vending machine in which a plurality of bottles is supported at a top portion of the bottle in the slot in an inclined dispensing rack. The inclined dispensing rack is provided with a pivotable gating member which is selectively engagable with a locking member, so as to control the sequential movement of bottles to be vended through the slot in the inclined dispensing rack. Upon engagement of the locking member with the gating member to lock the gating member in the first position, the gating member engages with the top portion of the next bottle to be vended to block movement of the next bottle to be vended to the opening at one end of the slot. Upon disengagement of the locking member from the gating member, the gating member releases and allows the gating member to pivot in a first direction to a second position under the influence of the top portion of the next bottle. The next bottle thus slides, under the influence of gravity, in a downwardly direction through the slots to the opening at one end thereof U.S. Pat. No. 6,199,720 (to Rudick, et al., issued Mar. 13, 2001) discloses a vending machine with a cabinet having a plurality of inclined, vertically spaced shelves. The shelves are able to selectively feed a beverage container to an elevator which is located adjacent an interior, right side wall of the cabinet of vending machine. A beverage container is dispensed by an escapement block of a shelf onto the elevator. The elevator vertically moves the beverage container, and then dispenses the beverage container to a delivery mechanism which gently lowers the beverage container to a delivery port which communicates with the exterior of the vending machine. The shelves in the cabinet are readily reconfigurable such that their vertical spacing within the cabinet can be easily altered. The escapement blocks of the shelves are mechanically activated to dispense a beverage container by an activation device on the elevator.

U.S. Pat. No. 6,230,908 (to Sloan, issued May 15, 2001) discloses a gravity flow rack including a frame with a plurality of elongated channels attached to the frame. Each channel includes two spaced apart sides and a base wall extending between the sides. A plurality of rollers is movably mounted in each one of the channels. A portion of each roller extends above the respective channel at a first height. A reverse flow stop is pivotally mounted within each channel for movement between a stop position and a flow position. Each stop includes a stop arm. A weighted portion is attached to each stop for automatically biasing each stop to the stop position whereby the respective stop arm extends above the respective channel at a second height, greater than the first height. When the stop is in the flow position, the stop arm extends above the channel at a height equal to or less than the first height.

U.S. Pat. No. 6,253,954 (to Yasaka, issued Jul. 3, 2001) discloses a storage/dispensing device for a vending machine. Each article rack for storing articles has an article passage for storing the articles in a horizontal row, and a dispensing opening formed at one end of the article passage for dispensing the articles. Each article-dispensing mechanism is provided for the corresponding article rack in a manner movable between a dispensing position and a holding position. A single drive source causes each article-dispensing mechanism to move between the dispensing position and the holding position. In one of the preferred embodiment of the Yasaka device, a base plate stopper is immovably mounted or set with respect to the article rack, the base plate abuts against the base plate stopper when it has moved to the dispensing position, whereby the base plate is positively inhibited from further advancing. This base plate stopper can be selectively mounted at any one of a plurality of mounting positions arranged in the horizontal direction, so that it is possible to change the stroke of the base plate between the standby position and the dispensing position, as required, according to the depth of each article to be dispensed. In another of the preferred Yasaka devices, the article storage/dispensing device further includes a gate for closing the dispensing opening to thereby hold the plurality of articles between the stopper and itself when the vending machine is in the standby state ready for vending the articles, and opening the dispensing opening during the vending operation of the vending machine for vending the articles.

As is evident from the abbreviated review of the prior art, the dispensing of products, including specifically, beverage containers of all kinds, contemplates either a mechanical or gravity assisted drive mechanism to incrementally feed containers from within the vending machine to a dispensing portal. In certain instances, the product is retrieved manually from the rack containing the selected product or ejected from such rack whereupon it arrives at a dispensing portal of the vending machine. In virtually all instances, the product feed within the rack is maintained in place (stored) until requested by a mechanical gate or stop. In the representative beverage dispensing vending machines described above, such gate or stop requires mechanical or electrical energy to free a stored product selection from a rack within the vending machine to allow for dispensing to a customer. Moreover, the relative complexity in such mechanisms and the controls for such mechanisms necessarily increases both cost, complexity and service related problems associated with their design and use. Accordingly, there continues to exist a need for improvement in such vending machines, specifically, in the simplification of such vending machines to both reduce their cost and improve their reliability.

OBJECTS OF THE INVENTION

It is the object of this invention to remedy the above as well as related deficiencies in the prior art.

More specifically, it is the principal object of the present invention to provide an improved vending machine for dispensing containers, including beverage containers.

It is another object of this invention to provide an improved vending machine for dispensing containers, including beverage containers, having reduced moving parts and enhanced simplicity of operation and reliability.

It is yet another object of this invention to provide an improved vending machine for dispensing containers, having a resilient mechanical stop or gate, that is essentially devoid of mechanical moving parts, to control the movement of product within the racks of a vending machine.

Additional objects of this invention include an improved method of dispensing products from a vending machine.

SUMMARY OF THE INVENTION

The above and related objects are achieved by providing a vending machine having a plurality of racks therein for dispensing products. Each rack within such vending machine has multiple product dispensing racks wherein each rack comprises a vertical, rectilinear channel defined by pairs of opposing panels or walls. Each channel of each rack has an open end at the top end thereof and closed end at the bottom end thereof, wherein the closed end includes a movable platform for support of product and an open end for dispensing product in response to consumer demand. The open end of the rack is further provided with at least one non-mechanical stop for control of the dispensing of products from such racks in response to customer demand. In the preferred embodiments of this invention, the non-mechanical stop is formed of a resilient deformable material (e.g. natural or synthetic rubber or an equivalent elastomer), and includes means for engagement of a complimentary recess or slot in the opposing panels which define the vertical channel of the product dispensing rack. In the preferred embodiments of this invention, more than one the stop or gate is provided at the open end of each racks within the vending machine, so as to provide equal pressure to each side of the container within the rack and, thus, assist in maintaining its proper orientation of the containers within the rack.

DETAILED DESCRIPTION OF THE INVENTION INCLUDING PREFERRED EMBODIMENTS

Figure 1:
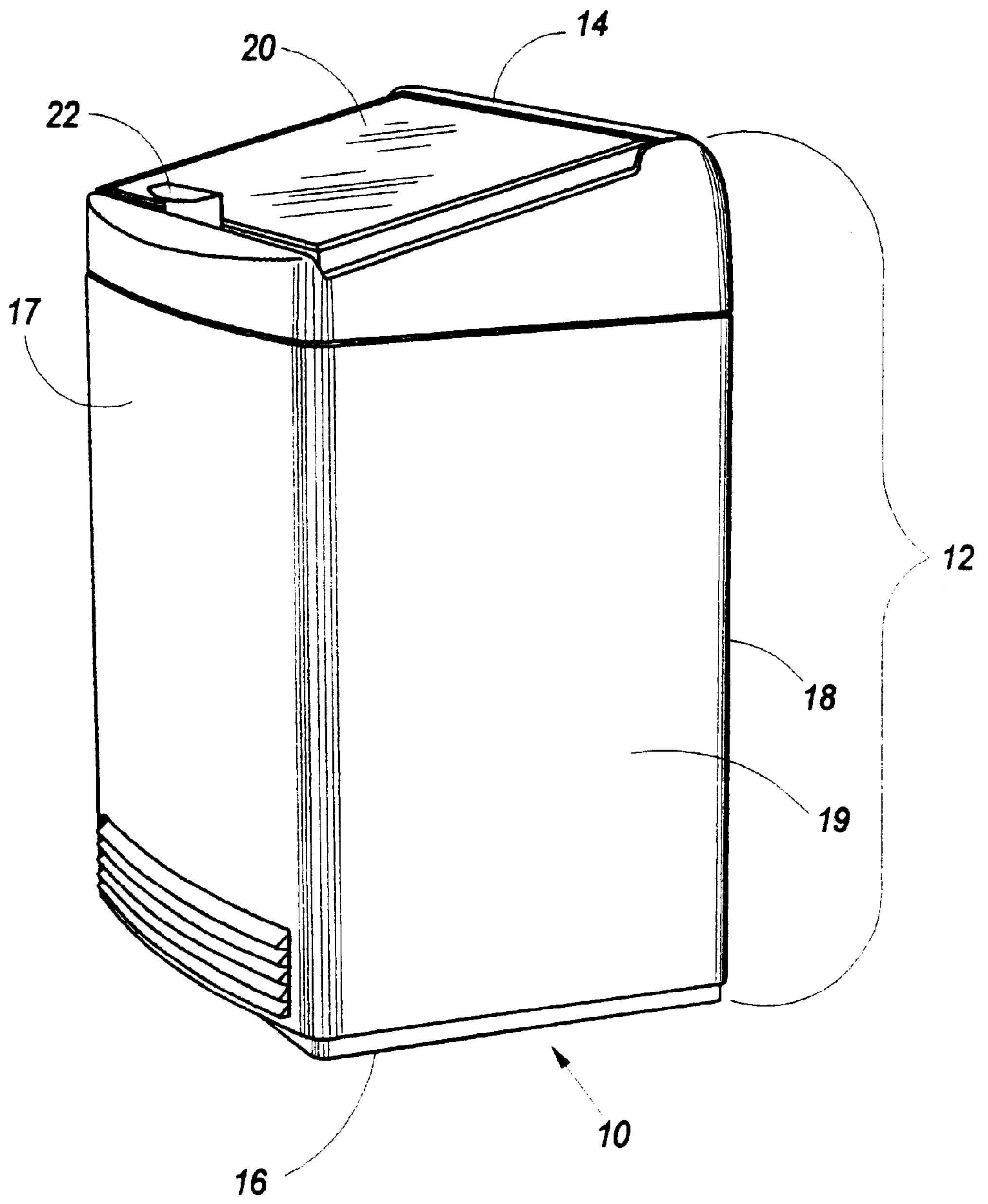
FIG. 1 is a perspective view of an improved vending machine of this invention.

The figures which accompany this application, and referenced herein, depict a representative vending machine of this invention. In the embodiments of this invention illustrated in these figures, one or more components of the vending machine may appear in more than one figure. Accordingly, components which are common to more than one figure are assigned a common reference numeral for continuity of description and ease of understanding.

In FIG. 1, a vending machine (10) is illustrated comprising a cabinet (12) having three dimensions, including a top (14), a bottom (16) and four sides (front (17), back (18), left side (19) and right side (not shown). In the embodiment illustrated in FIG. 1, the top (14) of the cabinet is provided with a hinged access door (20) to permit opening of the cabinet (12) to gain access to its contents. The access door (20) is shown in the locked or closed position. A latch (22) is associated with the top (14) of the cabinet (12) to disengage the access door (20) and thereby permit release and opening thereof The specific design of this vending machine (10) is intended for use in a retail establishment, wherein the customer makes his product selection independent of merchant assistance, and pays for his product selection, in the conventional manner, at the cash register. A coin operated mechanism (not shown) can be substituted for the latch (22) in stand-alone vending machines contemplated for use independent of a retail establishment.

The cabinet design of the preferred embodiment of a vending machine of this invention is asymmetrical in that the rear (18) of the cabinet is somewhat taller than the front (17) of the cabinet. This design choice is dictated by the inclination of a product support cradle (24) positioned within the vertical channel of the product dispenser rack assembly (25), shown in FIG. 2, specifically, the slope of the supporting surface of product cradle of the dispenser rack (26). In the embodiments of the vending machine illustrated in FIG. 2, the cabinet (12) houses an array of product dispensing racks (26), each capable of storage and dispensing different product containers. Thus, upon opening the access door (20) of the cabinet (12), the consumer simply makes his product selection by removal of the desired product from the open end (28) of a given dispenser rack (26). As a product is removed from a given dispenser rack (26), the product cradle (24) is urged upward by a coiled metal band (30) positioned relative to the underside of such cradle (24). The removal of a single product container allows for upward movement of the cradle (24), and thereby replacement of the product container removed by the consumer at the open end (28) of the dispenser rack (26).

Figure 3:
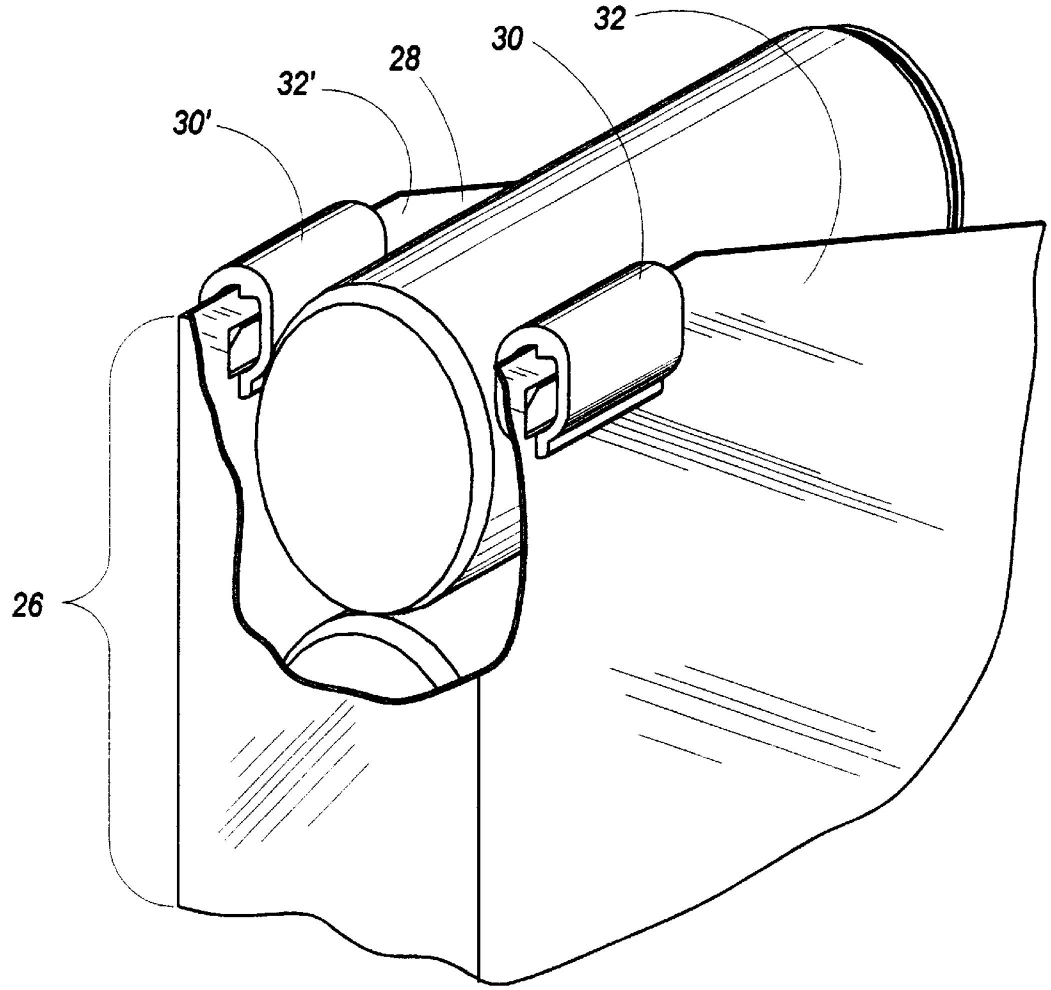
FIG. 3 is an enlarged view of the open end of a vertical rack within the vending machine of this invention.

As shown in FIG. 3, the open end (28) of the product dispenser rack (26) is provided with a pair of stops (30, 30') to restrict the open end (28) of the rack (26) and to retain the product container within the open end (28) of the rack (26) until selected/removed by a consumer. Each member of this pair of stops (30, 30') comprises a resilient material having sufficient physical mass and rigidity to resist the upward forces on the container by forces exerted on the underside of the cradle (24) and thereby provides a physical obstruction to the movement of the container through the open end (28) of the rack (26).

In the embodiment of the vending machine illustrated in FIG. 3, one end of the product container is allowed to extend above the open end (28) of the dispenser rack (26) to facilitate consumer access. This enhanced consumer access is accomplish by a combination of a cradle design and asymmetric placement of stops (30, 30') on the opposing panels (32, 32') which define the vertical channel of the dispenser rack (26). More specifically, each member of the pair of stops (30, 30') is positioned relative to one another at the open end (28) of the vertical channel of the dispensing rack (26), to restrict the opening of the channel at the open end (28) thereof, and to thereby retain a portion of the container within the dispenser rack.

Figure 2:
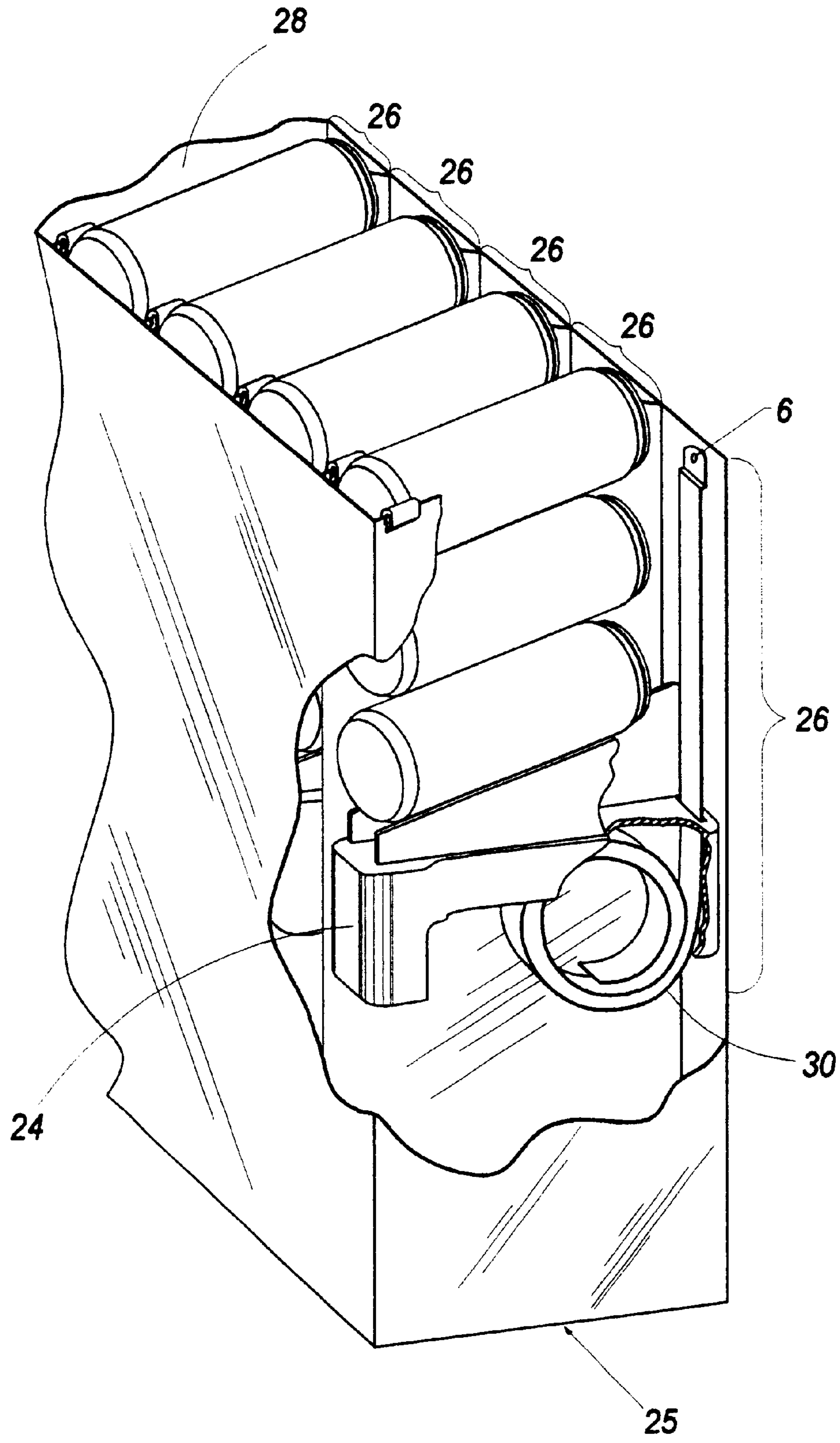
FIG. 2 is a cut-away view of the improved vending machine of this invention.

In the embodiment of the invention illustrated in FIGS. 2 & 3, the opposing panels (32, 32') which define the vertical channel of the dispensing rack (26), terminate in a manner so as to uniquely compliment the relative orientation of the product support cradle of the dispensing rack. More specifically, at least a portion of the terminal edge of each of these panels is configured to parallel the angular slope of the cradle. Thus, the placement of the stops on the terminal edge of the panels of the rack maintains the container within the rack at the same angle as the slope of the cradle supporting the product container. This feature is critical to both prevention of the product from becoming stuck within the vertical channel, and for the smooth transition of product through the channel. Such asymmetric placement of the stops (30, 30') on the opposing edges of the vertical channel, relative to the long dimension of the container, also leaves one end of the container accessible for removal from the vertical channel of the dispensing rack (26).

Figure 4:
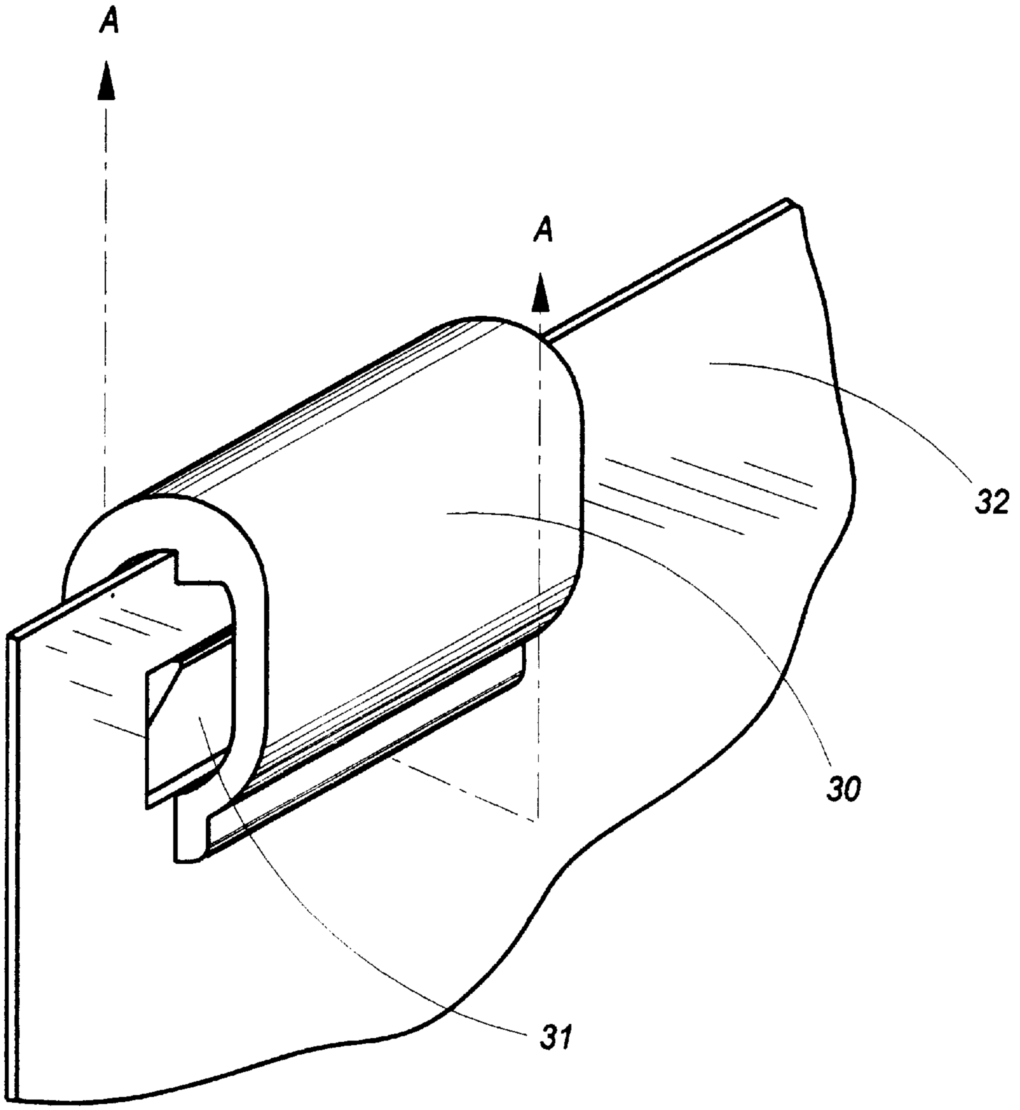
FIG. 4 is a further enlargement of a resilient mechanical stop positioned on the open end of the rack within the vending machine of this invention.

As further shown and emphasized in the enlarged view of the stop illustrated in FIG. 4, each stop (30, 30') is mounted on the open end (28) of the retainer rack (26) so as to couple to such rack (26). In the embodiment of the invention illustrated herein, the placement of each stop relative to the other provides an equal and opposing retaining force on product container within the rack. The means for mounting a stop on the open end (28) of the rack (26) is by complimentary interlocking means (31), specifically, by slidingly engaging the stop with the open end (28) of the rack (26) to effect placement of a feature (31) of the stop within a detent or slot (34) in the rack (26). This interlocking relationship is more clearly illustrated in the FIG. 5 at plane AA of FIG. 4. This view reveals the complimentary nature of each of these components, prior to pressure contact with a product container.

Figure 5:
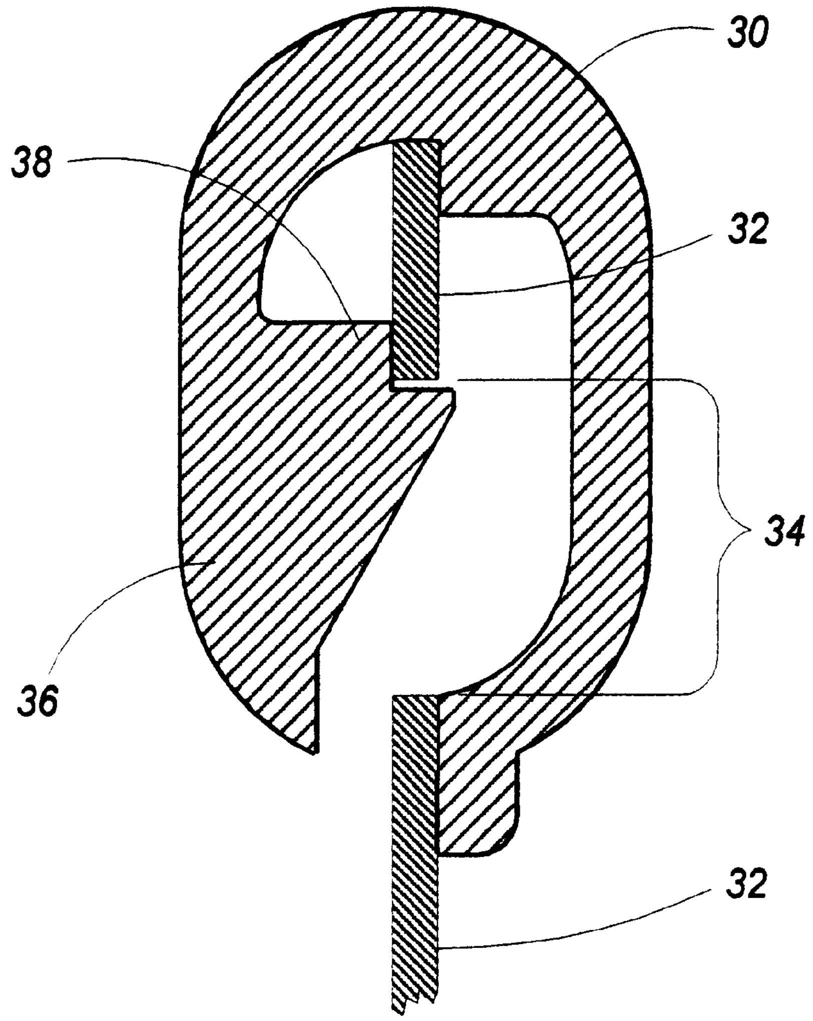
FIG. 5 is cross-section of a resilient mechanical stop of FIG. 4 at AA.

In the preferred embodiments of this invention, the stops can be fabricated from a variety of materials so long as their construction and design imparts properties consistent with resilient movement (e.g. compression and expansion), so as to permit removal of the product container from the dispensing rack. In FIG. 5, a cross-sectional view of the stop (30) reveals the interlocking relationship between the complimentary features (31 & 34) of these two elements. In this view, the relative free portion of the stop on the left (36) is designed for contact and restriction of the product container within the dispensing rack. This portion of the stop is designed for displacement into the void (34) of the dispensing rack upon removal of a container from the rack.

In the embodiment of the inventions illustrated in this above FIGS. 4 & 5, the stop (30) comprises a tubular structure with an open groove or air space (36) running from one end of the stop (30) to the other. The open air space (36) permits engagement of the stop (30) with the rack (26), and facilitates movement of the stop (30, 30') when a product container is selected for removal from the rack (26). The internal geometry of stop (30) includes limiting means (38) for positioning the stop (30) relative to the mounting features (34) that are formed in the rack (26). In the embodiment shown in FIG. 5, the stop mounting feature (34) is shown as a rectangular window, located in each of two opposing panels (32, 32') that define the open end (28) of the dispensing rack (26). The vertical channel in the rack, defined by these two opposing panels (32, 32'), is somewhat wider than the product container for which it has been designed. The placement of the stops (30, 30') on each of these opposing panels (32, 32') restricts the channel opening sufficiently to retain the product container in the rack, and yet permit its removal when sufficient physical force is applied, either by the consumer or from within the vending machine.

The foregoing description is intended as illustrative of some of the preferred embodiments of the invention, and the delineation of the scope thereof has been reserved for the claims that follow.

What is claimed is:

1. In a vending machine for dispensing product from a plurality of vertically disposed product racks housed therein, each of said product racks having an open end and a closed end, wherein said closed end includes a movable platform for support and movement of product within a vertical channel defined within said rack, wherein the improvement comprises:

a pair of essentially tubular stops positioned at said open end of said channel of each of said dispensing racks, wherein said stops are disposed on each of two opposing panels which define said channel so as to restrict said open end of said channel and thereby retain product within said channel, each of said stops being formed of a resilient, deformable material and having a protuberance formed therein to permit interlocking engagement with a slot in said opposing panels, whereby said interlocking engagement enables fixed attachment of said stops to said panels and retention of said stops to said panels even when deflected to permit removal of product from said channel.

2. The improved vending machine of claim 1, wherein said stops are comprised of an elastomeric material.

3. In a vending machine for dispensing product from a plurality of vertical product racks housed therein, each of said vertical product racks having an open end and a closed end, wherein said closed end includes a movable platform for support of product within a channel defined within said rack, and an open end for dispensing product from said open end of said channel of said rack, means for upward movement of said movable platform within said channel from said closed end toward said open end of said rack and restrictive means for preventing release of said product from said open end of said channel of said rack until consumer access thereto is desired, the improvement comprising:

a pair of essentially tubular stops positioned at said open end of said channel of each of said dispensing racks, wherein said stops are disposed on each of at least two opposing walls of said channel so as to restrict said open end of said channel and thereby retain product within said channel, each of said stops being formed of a resilient, deformable material and having a protuberance formed therein to permit interlocking engagement with a slot in said opposing walls at the open end of said channel, whereby said stops are essentially fixedly attached to said walls and maintained affixed thereto even when deflected upon removal of product from said channel of said rack.

4. The improved vending machine of claim 3, wherein said stop further comprises an elongate space formed along the length thereof, said space being dimensioned for edge mounting on said opposing walls of the open end of said dispensing rack.

5. The improved vending machine of claim 3, wherein at least two of said dispensing racks within a vending machine have a common wall defining a vertical channel in each of said dispensing racks, said common wall being provided with a single or common stop, so as to restrict the spaced relationship defined between each of said vertical channels in each of said dispensing racks having said common wall.

6. The improved vending machine of claim 3, wherein said vertical channel has an open end wherein a portion of said open end is inclined from the base of said vending machine relative to the entire length of said open end.

7. The improved ensemble of claim 6, wherein said pair of opposing stops are restrictive of said inclined portion of said open end of said vertical channel.

8. A stop suitable for placement on a panel of a rack in a vending machine to define a restrictive opening of a channel in the vending machine said stop comprising a tubular body having an exterior wall and an air space running the length of said tubular body to permit access through said tubular body wall, said stop having coupling means for engagement to said panel so as to permit mounting of said stop on said panel to restrict an opening of a channel defined by said panel in said vending machine.

* * * * *